(12) United States Patent
Asgari et al.

(10) Patent No.: US 12,703,802 B2
(45) Date of Patent: Aug. 11, 2026

(54) ANTIMICROBIAL COATING COMPOSITIONS AND RESIDUAL ANTIMICROBIAL COATINGS RESULTING THEREFROM

(71) Applicant: SRFC BIO, INC., Dallas, TX (US)

(72) Inventors: Parham Asgari, Dallas, TX (US); Robert Godfroid, McKinney, TX (US); Maha El-Sayed, Fremont, CA (US); Valerie Beck, Highland Village, TX (US); Devin Whorton, Irving, TX (US)

(73) Assignee: SRFC Bio, Inc., Dallas, TX (US)

( * ) Notice: Subject to any disclaimer, the term of this patent is extended or adjusted under 35 U.S.C. 154(b) by 729 days.

(21) Appl. No.: 17/960,920

(22) Filed: Oct. 6, 2022

(65) Prior Publication Data

US 2023/0108533 A1 Apr. 6, 2023

Related U.S. Application Data

(60) Provisional application No. 63/252,737, filed on Oct. 6, 2021.

(51) Int. Cl.
*C09D 5/14* (2006.01)
*C08K 5/00* (2006.01)
*C09D 157/00* (2006.01)

(52) U.S. Cl.
CPC .............. *C09D 5/14* (2013.01); *C08K 5/0058* (2013.01); *C09D 157/00* (2013.01)

(58) Field of Classification Search
CPC ........ A01N 25/10; A01N 47/44; A01N 33/12; A01N 33/04
See application file for complete search history.

(56) References Cited

U.S. PATENT DOCUMENTS 10,016,525 B2 * 7/2018 Adams ................. A61Q 17/005
2009/0155451 A1 * 6/2009 Ylitalo .................. A01N 25/10 427/8

(Continued)

FOREIGN PATENT DOCUMENTS

RU 2540478 C1 * 2/2015 .............. B82Y 5/00
WO 97/13520 A1 4/1997

(Continued)

OTHER PUBLICATIONS

Hateley, Martin, Supplementary European Search Report, Jun. 25, 2025.

(Continued)

*Primary Examiner* — Peter A Salamon
(74) *Attorney, Agent, or Firm* — Harper & Bates LLP; Scott L. Harper

(57) ABSTRACT

Aqueous coating compositions are disclosed that are capable of forming residual antimicrobial coatings having improved performance related to residual efficacy and duration. In various embodiments, an antimicrobial coating composition comprises at least one antimicrobial compound, at least one durable matrix forming compound, and optionally, at least one performance-enhancing additive. The antimicrobial compound is selected from non-silane quaternary compounds and quaternary silanes. The durable matrix forming compound is selected from polymers, non-polymeric organic compounds, inorganic substances, additional anti-microbial substances, reactive silanes, and non-reactive silanes. The performance-enhancing additive is selected from a polymer, a solvent, an inorganic substance, a surfactant, a crosslinker, a surface modifier, and chemical species capable of forming a sol-gel.

11 Claims, 9 Drawing Sheets

Compositions Used in Examples 1-18

| Example | Cross-linker | Hydrophilic silane | Hydrophobic silane | Antimicrobial cationic polymer | Antimicrobial active/Auxiliary antimicrobials | Additives |
|---|---|---|---|---|---|---|
| 1 | | | | | 0.01 - 4.0% | |
| 2 | | | | 0.01 - 4.0% | | |
| 3 | | | | 0.01 - 4.0% | 0.01 - 4.0% | |
| 4 | | | | 0.01 - 4.0% | | 0 - 8.0% |
| 5 | | | | | 0.01 - 4.0% | 0 - 8.0% |
| 6 | | | | 0.01 - 4.0% | 0.01 - 4.0% | 0 - 8.0% |
| 7 | | 0.01 - 15.0% | | | | |
| 8 | | | 0.01 - 15.0% | | | |
| 9 | 0.01 - 15.0% | | | | | |
| 10 | 0.01 - 15.0% | 0.01 - 15.0% | | | | |
| 11 | 0.01 - 15.0% | | 0.01 - 15.0% | | | |
| 12 | | 0.01 - 15.0% | 0.01 - 15.0% | | | |
| 13 | 0.01 - 15.0% | 0.01 - 15.0% | 0.01 - 15.0% | | | |
| 14 | 0.01 - 15.0% | | | | 0.01 - 4.0% | |
| 15 | 0.01 - 15.0% | | | 0.01 - 4.0% | | |
| 16 | 0.01 - 15.0% | | | 0.01 - 4.0% | | 0 - 8.0% |
| 17 | 0.01 - 15.0% | | | 0.01 - 4.0% | 0.01 - 4.0% | |
| 18 | 0.01 - 15.0% | | | 0.01 - 4.0% | 0.01 - 4.0% | 0 - 8.0% |

(56) References Cited

U.S. PATENT DOCUMENTS

| | | | | |
|---|---|---|---|---|
| 2010/0240799 | A1* | 9/2010 | Hofmann | A61K 8/8129 436/164 |
| 2015/0010715 | A1 | 1/2015 | Cook et al. | |
| 2016/0220728 | A1* | 8/2016 | Adams | A61K 8/20 |
| 2018/0000088 | A1 | 1/2018 | Chason et al. | |
| 2020/0215233 | A1* | 7/2020 | Boulos | A61K 31/194 |

FOREIGN PATENT DOCUMENTS

| | | | |
|---|---|---|---|
| WO | 2008/157323 | A1 | 12/2008 |
| WO | 2018/017557 | A1 | 1/2018 |
| WO | 2020035483 | A1 | 2/2020 |

OTHER PUBLICATIONS

Communication pursuant to Rules 70(2) and 70a(2) EPC, Jul. 25, 2025.

Rodriquez, Kari, Patent Cooperation Treaty International Search Report, Feb. 27, 2023.

Rodriquez, Kari, Patent Cooperation Treaty Written Opinion of the International Searching Authority, Feb. 27, 2023.

* cited by examiner

Compositions Used in Examples 1-18

<table>
<tr><th>Example</th><th>Cross-linker</th><th>Hydrophilic silane</th><th>Hydrophobic silane</th><th>Antimicrobial cationic polymer</th><th>Antimicrobial active/Auxiliary antimicrobials</th><th>Additives</th></tr>
<tr><td>1</td><td></td><td></td><td></td><td></td><td>0.01 - 4.0%</td><td></td></tr>
<tr><td>2</td><td></td><td></td><td></td><td>0.01 - 4.0%</td><td></td><td></td></tr>
<tr><td>3</td><td></td><td></td><td></td><td>0.01 - 4.0%</td><td>0.01 - 4.0%</td><td></td></tr>
<tr><td>4</td><td></td><td></td><td></td><td>0.01 - 4.0%</td><td></td><td>0 - 8.0%</td></tr>
<tr><td>5</td><td></td><td></td><td></td><td></td><td>0.01 - 4.0%</td><td>0 - 8.0%</td></tr>
<tr><td>6</td><td></td><td></td><td></td><td>0.01 - 4.0%</td><td>0.01 - 4.0%</td><td>0 - 8.0%</td></tr>
<tr><td>7</td><td></td><td>0.01 - 15.0%</td><td></td><td></td><td></td><td></td></tr>
<tr><td>8</td><td></td><td></td><td>0.01 - 15.0%</td><td></td><td></td><td></td></tr>
<tr><td>9</td><td>0.01 - 15.0%</td><td></td><td></td><td></td><td></td><td></td></tr>
<tr><td>10</td><td>0.01 - 15.0%</td><td>0.01 - 15.0%</td><td></td><td></td><td></td><td></td></tr>
<tr><td>11</td><td>0.01 - 15.0%</td><td></td><td>0.01 - 15.0%</td><td></td><td></td><td></td></tr>
<tr><td>12</td><td></td><td>0.01 - 15.0%</td><td>0.01 - 15.0%</td><td></td><td></td><td></td></tr>
<tr><td>13</td><td>0.01 - 15.0%</td><td>0.01 - 15.0%</td><td>0.01 - 15.0%</td><td></td><td></td><td></td></tr>
<tr><td>14</td><td colspan="3">0.01 - 15.0%</td><td></td><td>0.01 - 4.0%</td><td></td></tr>
<tr><td>15</td><td colspan="3">0.01 - 15.0%</td><td>0.01 - 4.0%</td><td></td><td></td></tr>
<tr><td>16</td><td colspan="3">0.01 - 15.0%</td><td>0.01 - 4.0%</td><td></td><td>0 - 8.0%</td></tr>
<tr><td>17</td><td colspan="3">0.01 - 15.0%</td><td>0.01 - 4.0%</td><td>0.01 - 4.0%</td><td></td></tr>
<tr><td>18</td><td colspan="3">0.01 - 15.0%</td><td>0.01 - 4.0%</td><td>0.01 - 4.0%</td><td>0 - 8.0%</td></tr>
</table>

FIG. 1

Antimicrobial Efficacy Tests Protocols

| Claim | Test Method | Organisms |
| --- | --- | --- |
| Bactericidal | AOAC Germicidal Spray Products Test | *S. enterica* (ATCC 10708); *P. aeruginosa* (ATCC 15442); *S. aureus* (ATCC 6538); *E. coli* O157:H7 (ATCC 35150); *S. aureus* (MRSA) (ATCC 33592) |
| Virucidal | Virucidal Efficacy of a Test Substance for Use on Inanimate, Nonporous Surfaces (ASTM E1053) | Influenza A (H1N1) Virus A/PR/8/34 Strain, ATCC VR-1469; Human Coronavirus, 229E Strain, ATCC VR-740 |
| Sanitizer | Efficacy of Sanitizers Recommended for Inanimate, Hard, Nonporous Non-Food Contact Surfaces via Spray Application (ASTM E1153) | *S. aureus* (ATCC 6538); *K. aerogenes* (ATCC 13048) |
| Residual Sanitizer | Residual Self-Sanitizing Activity of Dried Chemical Residues on Hard, Non-Porous Surfaces (Protocol 01-1A) | *S. aureus* (ATCC 6538); *K. aerogenes* (ATCC 13048) |

FIG. 2

ANTIMICROBIAL COATING COMPOSITIONS AND RESIDUAL ANTIMICROBIAL COATINGS RESULTING THEREFROM

CROSS-REFERENCE TO RELATED APPLICATIONS

This application claims priority to and the benefit of U.S. Provisional Patent Application Ser. No. 63/252,737, filed Oct. 6, 2021, entitled "Improved Antimicrobial Coating Compositions and Residual Antimicrobial Coatings Resulting Therefrom," which is incorporated by reference herein in its entirety.

The present disclosure generally relates to antimicrobial compositions and in particular to improved antimicrobial coating compositions capable of forming durable residual antimicrobial coatings on surfaces.

BACKGROUND

Residual antimicrobial coatings are of increasing importance in view of the SARS-CoV-2 (the virus causing COVID 19) pandemic and the thought that future pandemics are inevitable. Many residual antimicrobial coatings in both retail and institutional markets have poor efficacy, often only bactericidal. Thus, coating compositions are still needed that can provide strongly efficacious dried coatings capable of residual disinfectant levels of efficacy and efficacy against viruses so as to mitigate viral transmission through surface contact.

SUMMARY OF INVENTION

In accordance with various embodiments of the present disclosure, aqueous coating compositions are disclosed that are capable of forming residual antimicrobial coatings having improved performance related to residual efficacy and duration.

BRIEF DESCRIPTION OF THE DRAWING FIGURES

The subject matter is pointed out with particularity and claimed distinctly in the concluding portion of the specification. A more complete understanding, however, may best be obtained by referring to the detailed description and claims when considered in connection with the following drawing figures:

FIG. 1 illustrates a chart of the compositions used in eighteen (18) example formulations, as disclosed herein;

FIG. 2 illustrates a chart of the antimicrobial efficacy test protocols that were conducted on the example formulations disclosed in FIG. 1, as disclosed herein;

DETAILED DESCRIPTION

Figure 3:
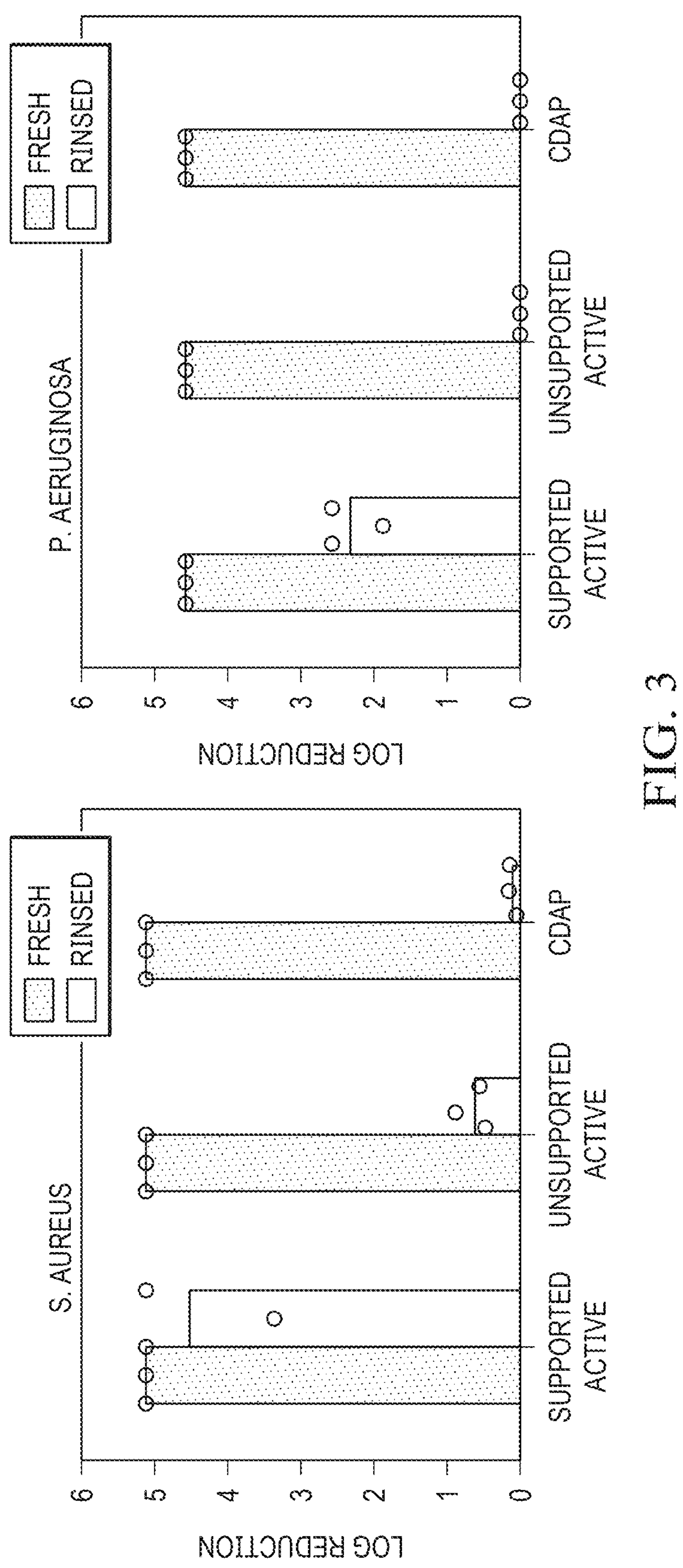
FIG. 3 illustrates a graphic comparison of matrix-supported active components to unsupported actives for a residual antimicrobial coating against bacteria according to embodiments of the invention disclosed herein.

The detailed description of exemplary embodiments makes reference to the accompanying drawings, which show exemplary embodiments by way of illustration and their best mode. While these exemplary embodiments are described in sufficient detail to enable those skilled in the art to practice the invention, it should be understood that other embodiments may be realized and that logical, chemical, and mechanical changes may be made without departing from the spirit and scope of the inventions. Thus, the detailed description is presented for purposes of illustration only and not of limitation. For example, unless otherwise noted, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments of the present disclosure, a residual antimicrobial coating composition is disclosed. In various embodiments, an antimicrobial coating composition is capable of forming a residual antimicrobial coating on a surface. In various embodiments, a residual antimicrobial coating in the form of a thin film is formed by applying the antimicrobial coating composition to a surface and, either allowing the composition to dry under ambient conditions or, drying the composition by applying an external force such as heat.

Definitions and Interpretations

As used herein, the term "cationic polymer" takes on its ordinary meaning in chemistry and refers to a positively charged macromolecule having one or more positively charged groups, comprising repeating chemical units referred to in chemistry as "monomers." Cationic polymers for use herein may comprise any type of linear, branched, homopolymer, or copolymer (block, random, etc.), with any number of monomers and any mixture of monomer types. The cationic group(s) on the "backbone" of the polymer may comprise any positively charged functional group in the backbone structure or appended to the backbone structure, such as a protonated amine or imine group, biguanides, a quaternary ammonium group, or a phosphonium group, amongst others. In various embodiments, a cationic polymer herein comprises a quaternary silane that is present as a polymer due to a reactive silane group, as defined below. In other embodiments, cationic polymers for use herein include various protonated or quaternized polymers that have antimicrobial activity, such as, but not limited to, poly(hexamethylene biguanide chloride) (PHMB), polyaminopropyl biguanide, polyethylene containing pendent biguanide groups, polymethacrylate containing pendent biguanide groups, polyethylene containing pendent ethyl dimethyl benzyl ammonium chloride groups, polymethacrylate containing pendent ethyl dimethyl benzyl ammonium chloride groups, co-polymers of 2-chloroethylvinyl ether and vinylbenzylchloride with immobilized ammonium or phosphonium salts, N-halamines and various cationic polyelectrolytes such as poly(lysine) hydrochloride or hydrobromide, poly(allylamine) hydrochloride or hydrobromide, poly(ethylenimine) (PEI), quaternary ammonium polysalts (polyionenes, quaternized poly(vinylpyridine), and various protonated polyamines such as polytriazines, polypyrrole, Polyvinylpyrrolidone, Polyvinylpolypyrrolidone polyimides, polyamide-imides, and polybenzimidazoles. Cationic polymers further include polycationic antimicrobial actives such as, for example, cationic peptidopolysaccharides and ionic poly [2-(tert-butylaminoethyl) methacrylate] (PTBAM). An extensive listing of cationic antimicrobial actives for use herein are reviewed by A. M. Carmona-Ribeiro, et al., "Cationic Antimicrobial Polymers and Their Assemblies," *Int. J. Mol. Sci.,* 14(5), 9906, 2013. In various embodiments, a cationic polymer herein may be referred to as a "polycation."

As used herein, the term "anionic polymer" takes on its ordinary meaning in chemistry and refers to a negatively charged macromolecule having one or more negatively charged groups, comprising repeating chemical units referred to in chemistry as "monomers." As used herein, the term "nonionic polymer" takes on its ordinary meaning in chemistry and refers to a macromolecule not having positive or negatively charged groups. As used herein, the term "amphoteric polymer" takes on its ordinary meaning in chemistry and refers to a macromolecule having both positive and negative groups such that there is no net charge to the polymer.

As used herein, the terms "hydrophobic" and "hydrophilic" take on their ordinary meaning in chemistry and refers to the affinity of a chemical or polymer toward water. Hydrophilic materials are those whose interaction with water maximizes contact by causing it to spread out. Those that reject water naturally, causing droplets to form, are hydrophobic. As used herein, the terms "hydrophobic polymer" and "hydrophilic polymer" take on their ordinary meaning in chemistry and refer to macromolecules that have selective affinity toward water.

As used herein, the terms "cross-linkers" are bonds or short sequences of bonds that connect two (difunctional cross-linkers) or more polymer chains (multifunctional cross-linkers). These connections may take the form of covalent or ionic bonds.

As used herein, the term "quaternary silane" refers to an organosilane of general formula $(R^1O)_3Si—R^2—Y$, or $[(R^1O)_3Si—R^2]_2Y$ wherein $R^1$ is H, methyl, ethyl, or a $C_3$-$C_6$ straight-chained, branched or cyclic alkyl group, with the proviso that the organosilane $(R^1O)_3Si—R^2—Y$ or $[(R^1O)_3Si—R^2]_2Y$ having $R^1$=$C_3$-$C_6$ straight-chained, branched or cyclic alkyl group is capable of hydrolyzing in an aqueous environment to $(HO)_3Si—R^2—Y$ or $[(HO)_3Si—R^2]_2Y$; $R^2$ is a bivalent linker; $Y={}^+—N(CH_3)_2(C_{18}H_{37})X^-$; ${}^+—N(CH_3)_2(C_{14}H_{29})X^-$; or ${}^+—N(C_{10}H_{21})_2(CH_3)X^-$; or ${}^+—NH(CH_2PhCHCH_2)X^-$; or $—NHC_2H_4({}^+NH_2CH_2PhCHCH_2)X^-$; or $-PhCH_2{}^+N(CH_3)_3X^-$ or $—C_3H_6SC(={}^+NH_2)(NH_2)X^-$ or ${}^+—N(CH_3)_3X^-$ and $X^-$=halide, sulfate, nitrate, phosphate, carbonate, organic sulfonate, organic carbonate, $BF_4^-$, or $ClO_4^-$. In various embodiments, a quaternary silane for use herein may comprise at least one of dimethyloctadecyl[3-(trihydroxysilyl)propyl]ammonium chloride, dimethyloctadecyl[3-(trimethoxysilyl)propyl]ammonium chloride, dimethyloctadecyl[3-(triethoxysilyl)propyl]ammonium chloride, dimethyltetradecyl[3-(trihydroxysilyl)propyl]ammonium chloride, dimethyltetradecyl[3-(trimethoxysilyl)propyl]ammonium chloride, dimethyltetradecyl[3-(triethoxysilyl)propyl]ammonium chloride, didecylmethyl[3-(trihydroxysilyl)propyl]ammonium chloride, didecylmethyl[3-(trimethoxysilyl)propyl] ammonium chloride, didecylmethyl[3-(triethoxysilyl)propyl]ammonium chloride, (Styrylmethyl)bis (triethoxysilylpropyl)ammonium chloride, 3-(N-Styrylmethyl-2-aminoethylamino)propyltrimethoxysilane hydrochloride, Tetradecyldimethyl(3-trimethoxysilylpropyl)ammonium chloride, 4-(Trimethoxysilylethyl)benzyltrimethylammonium chloride, S-(Trimethoxysilylpropyl)isothiouronium chloride, N-Trimethoxysilylpropyl-N,N,N-trimethylammonium chloride. Of particular interest herein are aqueous coating compositions comprising dimethyloctadecyl[3-(trimethoxysilyl)propyl]ammonium chloride (referred to herein as "DMOD") or its hydrolyzed equivalent, dimethyloctadecyl[3-(trihydroxysilyl)propyl]ammonium chloride.

Quaternary silanes for use in coatings herein form a subgroup of cationic polymers in that the above-mentioned, and other related alkoxy or hydroxy silanes, have a propensity to polymerize in aqueous environments. The polymerization comprises condensation to form Si—O—Si bonds by loss of water or alcohol. This polymerization is thoroughly described in A. Issa, et al., "Kinetics of Alkoxysilanes and Organoalkoxysilanes Polymerization: A Review," *Polymers,* 11, 537 (2019). Therefore, it is not the presence of the quaternary ammonium substituent in the quaternary silanes that cause polymerization, but rather the presence of a reactive silane group comprising an alkoxy or hydroxy group directly bonded to silicon. The silane polymer may be characterized as a homopolymer, copolymer, or cross-linked polymer, or mixtures of these. A cationic polymer comprising a quaternary silane is distinguishable from a traditional, non-silane quaternary ammonium compound because the latter is not capable of polymerization and exists only as monomeric species in solution.

As used herein, the term "antimicrobial" used generally to indicate ingredients that can cause at least some level of microbe kill as a composition applied to a contaminated surface, or by a dried coating present on a surface. For example, antimicrobial may be used to indicate a biostatic efficacy, a sanitizing level (3-log, or 99.9%) reduction in at least one organism, a disinfecting level (5-log, or 99.999%) reduction in at least one organism, or sterilization (no detectable organisms). Microbes, or microorganisms, may include any species of bacteria, virus, mold, yeast, or spore. Thus, antimicrobial herein encompasses antiviral, antibacterial, antifungal, and antispore.

As used herein, the term "residual antimicrobial coating" refers to a dry, thin-film coating on a surface that is capable of exhibiting residual antimicrobial efficacy. In various embodiments, the residual antimicrobial coating on a surface comprises a cationic polymer, such as a polyhexanide in a protonated form. In various examples herein, a residual antimicrobial coating on a surface may comprise at least one antimicrobial as defined above. In various examples herein, a residual antimicrobial coating on a surface may comprise at least one non-silane quaternary as defined above. In various examples herein, a residual antimicrobial coating on a surface may comprise at least one quaternary silane and at least one non-silane quaternary compound. Residual antimicrobial coatings may have been formed on a surface by disposition of a residual antimicrobial coating composition on the surface followed by drying. Such coatings are so thin they are typically not observable by the naked eye nor scrapable by any sort of sharpened tool. In various embodiments, these base compositions may be modified by other ingredients termed "performance-enhancing additives," to improve contact sanitization/disinfection, coating durability, residual antimicrobial efficacy and/or other performance attributes.

As used herein, the term "residual antimicrobial efficacy" refers to a characteristic shown by a dried residual antimicrobial coating on a surface. The characteristic or property of the coating is that the coating exhibits and maintains antimicrobial efficacy over a certain period of time under certain conditions. A coating on a surface may maintain residual antimicrobial efficacy indefinitely, or the coating may eventually "wear out" and lose its residual antimicrobial efficacy. An antimicrobial coating composition may provide multi-functionality in that it may first act as a multi-purpose cleaner, and contact sanitizer, disinfectant, or sterilant when applied wet to a contaminated surface, but then it may leave behind a residual antimicrobial coating on the surface once dried on that surface. The dried coating is then able to keep inactivating new microorganisms that come into contact with the coating. Antimicrobial coating compositions for use in various embodiments may provide a coating exhibiting residual antimicrobial efficacy, meaning that a microorganism later inoculated on, or that otherwise comes into contact with, the coating on the surface may experience cell death, destruction, or inactivation. The residual antimicrobial effect made possible by the coatings herein is not limited by a particular mechanism of action, and no such theories are proffered. For example, an antimicrobial effect measured for a coating dried on a surface may be the result of intracellular mutations, inhibition of certain cellular processes, rupture of a cell wall, or a nondescript inactivation of the organism, such as in the case of viruses. Other antimicrobial effects may include, for example, inhibiting the reproduction of an organism, or inhibiting the organism's ability to accumulate into biofilms.

As used herein, the terms "traditional disinfectant", "monomeric disinfectant", "monomeric antimicrobials", "auxiliary antimicrobials", or "actives" interchangeably refer to a monomeric molecule comprising, silver chloride, silver nanoparticle, silver iodide, PHMB, chlorhexidine digluconate, chlorhexidine diacetate, phenol, O-phenyl-phenol, NaDCC, acetic acid, citric acid, glycolic acid, lactic acid, propionic acid, thymol, dodecyl benzenesulfonic acid, methylisothiazolinone, and zinc pyrithione.

As used herein, the terms "traditional quaternary ammonium compound," "monomeric quaternary ammonium compound," "unsupported quats" or "non-silane quaternary compound," interchangeably refer to a monomeric molecule comprising a quaternary ammonium functionality, but not containing any reactive silicon atoms capable of hydrolysis/polymerization, and are thus distinguishable from the above mentioned "cationic polymer" genus of compounds and "quaternary silane" subgenus of compounds. Typical non-silane quaternary compounds are of the formula $^{+}N(R^3R^4R^5R^6)X^-$, wherein the four substituents bonded to nitrogen, $R^3$, $R^4$, $R^5$, and $R^6$, are independently alkyl, benzyl or alkyl benzyl, and $X^-$=halide, sulfate, nitrate, phosphate, carbonate, organic sulfonate, organic carbonate, $BF_4^-$, or $ClO_4^-$, typically chloride. The non-silane quaternary compounds of interest herein are generally antimicrobial and are found in contact sanitizers and disinfectants. These quaternary ammonium antimicrobials (also known as "quaternary ammonium compounds" or simply "quats") are supplied, for example, by Arxada (Lonza), Stepan, and Pilot (having acquired the quats from Mason Chemical) and others, under various brand names, such as Bardac® and Barquat® from Arxada (Lonza), BTC® and Stepanquat® from Stepan, and Mason® from Pilot. It should be noted that most of these quaternary compounds are mixtures of active materials in order to achieve broad spectrum antimicrobial efficacy, and most of these further comprise mixtures of alkyl chain lengths. These compounds are referred to as monomeric and are entirely distinguishable structurally from cationic polymers such as quaternary silanes as defined above.

In various embodiments, a non-silane quaternary compound for use herein may comprise BTC®-1210 (mixture of n-alkyldimethylbenzyl ammonium chloride and didecyldimethyl ammonium chloride); BTC®-1010 (didecyldimethyl ammonium chloride); BTC®-2125M (mixture of n-alkyldimethylbenzyl ammonium chloride and n-alkyl dimethylethylbenzyl ammonium chloride); Stepanquat® 2125M (mixture of n-alkyldimethylbenzyl ammonium chloride and n-alkyl dimethylethylbenzyl ammonium chloride); BTC®-885 (mixture of n-alkyldimethylbenzyl ammonium chloride and dialkyldimethyl ammonium chloride); BTC®-8358 (n-alkyldimethylbenzyl ammonium chloride); Bardac® 205M (mixture of alkyldimethylbenzyl and dialkyldimethyl ammonium chloride); Barquat® MB-80 (alkyldimethylbenzyl ammonium chloride); Mason® CS 125 (50% active alkyldimethylbenzyl ammonium chloride, with a distribution of chain lengths C12 67%, C14 25%, C16 7%, and C18 1%); Mason® CS-15M and 24M (mixture of dialkyldimethyl ammonium chlorides and alkyldimethylbenzyl ammonium chloride); and Mason® CS-425 (50% active alkyldimethylbenzyl ammonium chloride having a chain length distribution of C12 40%, C14 50%, C16 10%, and C16 10%). This list is not meant to be limiting in any sense, but is instead intended to show the breadth of non-silane, monomeric quaternary compounds that might be used in various surface sanitizers and disinfectants used to sanitize and/or disinfect surfaces, and that may be left on the surface when incorporated in coating compositions designed to trap these species or attach these species to a surface such as within a durable matrix.

As used herein, the term "cationic compound" takes on its ordinary meaning in chemistry as a positively charged molecular species. Herein, this includes both cationic polymers (particularly those capable of antimicrobial activity), such as guanidine-based compounds and quaternary silanes, along with non-silane, monomeric quaternary ammonium compounds, both defined herein above.

As used herein, the term "antimicrobial coating composition" refers to a liquid chemical composition comprising at least one chemical species in a liquid carrier such as water, which is used to produce a residual antimicrobial coating on a surface by application of the liquid composition to the surface and then drying it or allowing it to dry at ambient condition. The term is also used for liquid compositions that may find use as a germicidal spray (disinfectant or sanitizer), since a liquid germicidal spray composition could then go on to dry into an antimicrobial coating that exhibits residual antimicrobial efficacy. Of particular interest herein are liquid antimicrobial coating compositions capable of this multi-functionality. That includes, acting as a cleaner, and providing contact sanitization/disinfection of a surface and also the ability to dry into a residual antimicrobial coating on the surface. In various embodiments, an antimicrobial coating composition may comprise a complex mixture of chemical substances, such as quaternary silanes, non-quaternary silanes, traditional non-silane quaternary compounds, polymers, and amines, some of which may chemically react (hydrolyze, self-condense, etc.) within the composition, such as with water, to produce identifiable or perhaps unidentifiable reaction products. Antimicrobial coating compositions herein may include at least one performance-enhancing additive and other excipients, such as for example, non-aqueous solvents, buffers, acids, alkali, surfactants, emulsifiers, stabilizers, thickeners, free-radical initiators, catalysts, dyes, indicators, defoamers, leveling agents, surface modifiers, and film forming agents, and the like.

As used herein, the term "surface" refers to a portion of an object capable of treatment with a cleaner, a disinfectant, or any other type of chemical, such as being coating with a residual antimicrobial composition or washed and sanitized with a quaternary ammonium disinfectant, or disinfected and coated with a single composition capable of both functions. The surface may comprise an exposed portion, such as one side for example, of an object that is subjected to cleaning, contact sanitizing/disinfecting and/or coating. A surface herein may comprise a "hard surface" or a "soft surface." The terms hard and soft, when used in conjunction with the term surface, are well known terms of art. A hard surface may comprise a nonporous or a porous material. Likewise, a soft surface may comprise a nonporous or a porous material. An example of a hard, nonporous surface herein is a steel surface or a glass surface. An example of a hard, porous surface is unfired pottery, or raw-ware, for example. An example of a soft, nonporous surface herein is a vinyl surface, such as a seat cushion upholstered with Naugahyde® or other brand of vinyl fabric. A soft, porous surface, may be a canvas gurney or stretcher, for example. These examples are not meant to be limiting, but instead are presented in order to demonstrate the breadth of surfaces that may be coated with the improved coating compositions of the present disclosure.

As used herein, the terms "performance-enhancing additive" or more simply, "additive," broadly refer to a performance-enhancing chemical ingredient capable of improving the performance of an antimicrobial coating composition and/or the dried residual antimicrobial coating resulting therefrom. Performance, in accordance with the present disclosure, refers to how well an antimicrobial coating composition and/or a resulting residual antimicrobial coating meet certain objective or subjective criteria or attributes. Performance criteria that one might want to improve include, but are not limited to, contact antimicrobial efficacy (contact sanitization/disinfection), odor, toxicity, skin/eye hazard level, solution stability, evaporation rate, wettability, spreadability on certain surfaces, aesthetics of the resulting coating, durability, moisture resistance, abrasion resistance, adhesion to certain surfaces, residual antimicrobial efficacy, broad spectrum efficacy, prolonged release of antimicrobial actives, and ability to be cleaned, disinfected and/or replenished. For example, a coating composition herein, being a liquid solution, may be capable of contact sanitization or disinfection when the liquid solution is applied to a contaminated surface. This feature, if present, may be improved upon by including, for example, broad spectrum antimicrobials in the solution, mixtures of various types of antimicrobial actives, potentiators such as surfactants, solvents (ethanol, isopropyl alcohol), and so forth. Then, once the solution dries and forms an antimicrobial coating on the surface, that coating exhibits certain characteristics that could be improved upon by the addition of performance-enhancing additives. These characteristics of a residual antimicrobial coating include, for example, durability, such as against mechanical wear/abrasion, frequent human handling/touching, moisture, purposeful washing/cleaning, and the like, and the residual antimicrobial efficacy of the coating, including, for example, $\log_{10}$ kill level for various organisms, time required to kill organisms inoculated onto the coating, genus/species of organisms mitigated by the coating, and so forth. Durability and residual antimicrobial efficacy are related in the sense that if an antimicrobial coating is sufficiently worn, such as if the surface is repeatedly handled or partly washed off with a cleaner, the remaining coating may no longer be effective against certain organisms. As will be detailed herein, certain chemical additives are used to improve at least one of these performance attributes.

As used herein, a performance-enhancing additive may be a chemical from any one of several chemical classes. In various embodiments, a performance-enhancing additive is, for example, an antimicrobial active, a polymer, a solvent, an inorganic substance, a surfactant, a crosslinker, or a surface modifier, or one or more chemical species capable of forming a sol-gel.

As used herein, distinction is made between "ambient drying" and "heated drying." In various embodiments, antimicrobial coating compositions are applied to surfaces, such as by electrostatic spraying, and the resulting wetted surfaces are left to dry at ambient, i.e., at room temperature and humidity. In other examples, aqueous antimicrobial coating compositions applied to a surface may be heated in order to accelerate drying. In various embodiments, antimicrobial coating compositions are applied to surfaces and allowed to remain wet on the surface for purposes of contact sanitization/disinfection, and then dried (at ambient or with heated drying) to form a residual antimicrobial coating on the now-sanitized/disinfected surface.

As used herein, the term "weight percent," abbreviated "wt. %," takes on the ordinary meaning of percent (%) by weight of an ingredient in a chemical composition, based on the total weight of the composition "as made." For example, an aqueous composition consisting essentially of 1.0 wt. % amine "based on the total weight of the composition" equates to a composition containing 99.0 grams water and 1.0 gram amine. Wt. % in a composition indicates the wt. % of active material, unless indicated otherwise. "As made" means that a composition as listed shows what was added to a mixing vessel and not what might end up in the mixture after certain ingredients are given sufficient time to hydrolyze or react with each other in solution, such as if an ingredient hydrolyzes, self-polymerizes, co-polymerizes, forms adducts, or is neutralized in an acid-base reaction by another ingredient.

As used herein, the acronym "q.s.," used in association with an ingredient in a composition, refers to "quantity sufficient," which in formulation chemistry means that the ingredient is present in the composition in the amount necessary to total the composition to 100%. Typically, the ingredient(s) associated with "q.s." in a composition is the diluent, which may be entirely water, entirely non-aqueous solvent, or an aqueous mixture of solvents. Antimicrobial coating compositions herein may be entirely aqueous, other than small amounts of solvent entrained in the composition from various raw materials, or antimicrobial coating compositions may include substantial amounts of alcohol (ethanol, isopropanol) to improve contact sanitization/disinfection and/or to shorten drying time on a surface.

As used herein, use of a single organosilane species fitting the general structure R—Si(OR')$_3$ in a composition is understood to include homologous silanes having the same non-hydrolysable R group but different R' groups such that the organosilane is capable of hydrolyzing in water to the corresponding hydrolysis product R—Si(OH)$_3$. Functional organosilanes having the general structure R—Si(OR')$_3$ are known to readily hydrolyze in water to the corresponding silanetriol R—Si(OH)$_3$ and alcohol R' OH provided the R' group is not sterically large. For example, 3-aminopropyltrimethoxysilane and 3-aminopropylsilanetriol are understood to be functional substitutes for 3-aminopropyltriethoxysilane in aqueous antimicrobial coating compositions. The scope of the present disclosure also encompasses mixed alkoxysilanes where the three R' groups are not the same. Further, for organosilanes comprising a quaternary ammonium substituent, it is understood that any anionic counterion (halogens such as $Cl^-$, $Br^-$, $I^-$, inorganic or organic anions, etc.) are included in the scope of the present disclosure. When weight percentages are stated in a composition, the silane listed is either the one actually used in the composition in the amount indicated, or the silane used in the composition is "normalized" to the hydrolysis product R—Si(OH)$_3$ and that is shown in the composition.

As used herein, the terms "carrier," "test carrier," and "coupon" are used interchangeably to mean a small test surface used to conduct various tests in a laboratory setting. In various embodiments, a carrier may comprise for example a 1 inch×1 inch or 2 inch×2 inch square piece of thin 304 stainless steel. A "group of test carriers" refers to a plurality of coupons that may have been treated simultaneously in the same protocol, such as if the coupons are arranged as tiles into an array for coating as a group. Unless indicated otherwise, the term "stainless steel carrier" refers to a 304 stainless steel coupon.

As used herein, the term "fresh" refers to a carrier previously coated with an antimicrobial coating composition but not subjected to any mechanical abrasion prior to measuring residual antimicrobial efficacy of the coating.

As used herein, the term "worn" refers to a carrier previously coated with an antimicrobial coating composition and also subjected to mechanical abrasion prior to measuring residual antimicrobial efficacy of the coating. In this way, the antimicrobial efficacy of worn coatings give an indication of the durability of a coating.

As a further note, a dried residual antimicrobial coating may be referred to by the corresponding aqueous antimicrobial coating composition "identifier." This is for the sake of simplicity. In other words, both a composition, and a dried coating resulting from the composition, may be referred to by the same identifying name.

General Embodiments

In various embodiments, an antimicrobial coating composition is capable of forming a residual antimicrobial coating on a surface. The antimicrobial coating composition is preferably an aqueous composition. In various embodiments, a residual antimicrobial coating in the form of a thin film is formed by applying the antimicrobial coating composition to a surface and, either allowing the composition to dry under ambient conditions or, drying the composition by applying an external force such as heat. The antimicrobial coating on a surface comprises a dry durable matrix. In various embodiments, a durable matrix comprises a polymeric structure and at least one antimicrobial compound embedded therein. The durable matrix may comprise any combination of one or more polymers, non-polymeric organic compounds, inorganic substances, silane or mixtures of silanes, and/or additional antimicrobial substances including quaternary silanes, other hydrolysable silanes, and non-hydrolysable silanes.

In various embodiments, an antimicrobial coating composition comprises at least one antimicrobial compound and at least one compound capable of forming a durable matrix in which at least one antimicrobial compound is embedded. In various embodiments, the antimicrobial coating composition further comprises at least one performance-enhancing additive.

In various embodiments, a durable matrix in accordance with the present disclosure consists of a mixture of ingredients to set a hydrophilic/lipophilic balance (HLB) for the matrix such that a controlled release of free antimicrobials from the surface of the durable matrix is optimized, thus providing a maximum antimicrobial efficacy.

In various embodiments, the antimicrobial embedded within the durable matrix comprises at least one non-silane quaternary compound and/or at least one quaternary silane.

In various embodiments, mechanical abrasion of the durable matrix exposes fresh anti-microbial ingredients. In this way, frequent handling of surfaces that comprise a residual antimicrobial coating in accordance with the present disclosure cause the coating to be worn down, wherein such wear exposes new coating surfaces and, consequently, more antimicrobial.

In various embodiments, residual antimicrobial coatings in accordance with the present disclosure are capable of being cleaned and/or sanitized/disinfected, with the cleaning and/or sanitizing/disinfecting process optionally replenishing the existing durable coating with additional antimicrobial actives.

In various embodiments, application of fresh residual antimicrobial coating composition sanitizes/disinfects the previously coated surface and replenishes the residual antimicrobial coating with additional antimicrobial. Stated another way, the same residual antimicrobial coating composition can be used to form the initial coating, sanitize/disinfect the surface, and replenish the coating as needed over time. In various aspects, the residual antimicrobial coating composition, when applied to an existing residual antimicrobial coating obtained from same, redissolves or binds with the worn coating, creating a new antimicrobial surface.

In various embodiments, an antimicrobial coating composition comprises at least one non-silane quaternary compound, and at least one durable-matrix forming compound. Optionally the coating composition may further comprise at least one performance-enhancing additive.

In various embodiments, an antimicrobial coating composition comprises at least one quaternary silane, and at least one durable-matrix forming compound. Optionally the coating composition may further comprise at least one performance-enhancing additive.

In various embodiments, an antimicrobial coating composition comprises at least one quaternary silane, at least one non-silane quaternary compound, and at least one durable-matrix forming compound. Optionally the coating composition may further comprise at least one performance-enhancing additive.

Durable Matrix Forming Compounds

Matrix forming compounds herein broadly include both organic and inorganic materials, including organic polymers and monomers. A durable matrix may be formed by using just a single polymer, such as a polyacrylate or a polyvinyl alcohol, in the residual antimicrobial coating composition. In other embodiments, a mixture of organic and inorganic materials may work synergistically to form a durable matrix for nesting an antimicrobial. In various embodiments, a durable matrix forming compound herein comprises an organosilane. In other embodiments, a mixture of organosilanes is used to form a durable matrix. In other aspects, mixtures of organosilanes, inorganic substances, and/or organic polymers are used to form a durable matrix for nesting an antimicrobial. In general, a durable matrix forming compound is selected from the group consisting of polymers, non-polymeric organic compounds, inorganic substances, additional antimicrobial substances including quaternary silanes, reactive silanes, non-reactive silanes, and mixtures thereof.

Performance-Enhancing Additives

In various embodiments, an antimicrobial coating composition further comprises at least one performance-enhancing additive. Performance-enhancing additives herein include, but are not limited to, an antimicrobial, a polymer, a solvent, an inorganic substance, a surfactant, a crosslinker, a surface modifier, or one or more chemical species capable of forming a sol-gel.

In various embodiments, a polymer may be anionic, nonionic, cationic, or amphoteric.

In various embodiments, a surfactant may be anionic, nonionic, cationic, or amphoteric.

Performance Attributes for Optimization

In various embodiments, it may be desirable to form a durable matrix to suspend an antimicrobial active.

In various embodiments, it may be desirable to adjust hydrophilicity/hydrophobicity of the coating so as to optimize adhesion to a surface, durability, resistance to cleaners, and how the surface interacts with organisms.

In various embodiments, it may be desirable to have a system that is self-priming and that shows good adhesion to surface.

In various embodiments, it may be desirable to have a water-based (aqueous) coating composition.

In various embodiments, it may be desirable to have a coating that is replenishable, such as with the same composition that formed the initial coating.

In various embodiments, it may be desirable to have a coating composition that when applied to an existing coating formed from the same, the composition can diffuse and recombine with the existing coating.

In various embodiments, it may be desirable to have a residual antimicrobial coating that is compatible with common disinfectants and cleaners (e.g., peroxide, bleach, quats, and so forth).

In various embodiments, it may be desirable to formulate a coating composition with a mild pH, and that has a long shelf life without formation of precipitates.

In various embodiments, it may be desirable to have a coating composition that can cure at room temperature, without heat applied.

In various embodiments, it may be desirable to have a coating composition that can dry into a residual antimicrobial coating that is both invisible and not detectable by feel (e.g., not tacky).

In various embodiments, it may be desirable to have a residual antimicrobial coating that is detectable through chemistry or instrumentation.

General Compositions

In various embodiments, an antimicrobial coating composition in accordance with the present disclosure comprises from about 0.01 wt. % to about 15 wt. % of a durable matrix forming compound; from about 0.01 wt. % to about 4 wt. % antimicrobial active, and from 0 wt. % to about 8 wt. % of a performance-enhancing additive, with the remainder being water or water-solvent mixture. A composition fitting within these limitations was used to form a residual antimicrobial coating, tested below.

In various embodiments, the durable matrix forming compound comprises at least one of an organic substance and an inorganic substance. In various embodiments, the durable matrix forming component of the composition comprises a mixture of organic substances and inorganic substances. In various embodiments, the organic portion comprises a mixture of hydrophobic and hydrophilic organosilanes.

In various embodiments, the antimicrobial active is selected from the group consisting of non-silane quaternary compounds, quaternary silanes, cationic peptidopolysaccharides, ionenes, polyhexamethylene biguanide (PHMB) polyethylenimines (PEIs), ionic poly [2-(tert-butylaminoethyl) methacrylate] (PTBAM), and mixtures thereof.

In various embodiments, the performance-enhancing additive comprises at least one of an antimicrobial, a polymer, a solvent, an inorganic substance, a surfactant, a crosslinker, a surface modifier, and a chemical species capable of forming a sol-gel.

In various embodiments, a residual antimicrobial coating is formed on a surface by applying an antimicrobial coating composition to the surface, the antimicrobial coating composition comprising from about 0.01 wt. % to about 15 wt. % of a durable matrix forming compound; from about 0.01 wt. % to about 4 wt. % antimicrobial active, and from 0 wt. % to about 8 wt. % of a performance-enhancing additive, with the remainder being water or water-solvent mixture; and either allowing the composition to dry at ambient on the surface or drying the composition on the surface by applying an external force such as heat.

Experimental Results

Table 1 sets forth a listing of the formulation components for various embodiments of the improved antimicrobial coating disclosed herein.

TABLE 1

| Formulation Components | |
|---|---|
| Cross-linker | $AlCl_3$ |
| | $B(OH)_3$ |
| | $TiCl_4$ |
| | $Ti(OiPr)_4$ |
| | $SiCl_4$ |
| | $Si(OMe)_4$ |
| | $Si(OEt)_4$ |

TABLE 1-continued

| Formulation Components | |
|---|---|
| | Pentaerythritol |
| | Neopentylglycol |
| Hydrophilic silane | Aminopropyltriethoxysilane |
| | 3-Aminopropyl(diethoxy)methylsilane |
| | Trimethoxy[3-(methylamino)propyl]silane |
| | N-[3-(Trimethoxysilyl)propyl]ethylenediamine |
| | 3-(2-Aminoethylamino)propyldimethoxymethylsilane |
| | N1-(3-Trimethoxysilylpropyl)diethylenetriamine |
| | N-[3-(Trimethoxysilyl)propyl]butan-1-amine |
| Hydrophobic silane | Methyltriethoxysilane |
| | Ethyltriethoxysilane |
| | Propyltriethoxysilane |
| | Dimethyldimethoxysilane |
| | Bis(triethoxysilyl)methane |
| | Bis(triethoxysilyl)ethane |
| Antimicrobial cationic polymer | Peptidopolysaccharides |
| | Ionenes |
| | Polyhexamethylene biguanide (PHMB) |
| | Polyethylenimines (PEIs) |
| | Ionic poly [2-(tert-butylaminoethyl) methacrylate] (PTBAM) |
| | 3-(Trihydroxysilyl)propan-1-aminium chloride |
| | 3-(Trihydroxysilyl)propan-1-aminium acetate |
| | N,N-Didecyl-N-methyl-N-(3-trimethoxysilylpropyl)ammonium chloride |
| | Octadecyldimethyl(3-trimethoxysilylpropyl)ammonium chloride |
| | (Styrylmethyl)bis(triethoxysilylpropyl)ammonium chloride |
| | 3-(N-Styrylmethyl-2-aminoethylamino)propyltrimethoxysilane hydrochloride |
| | Tetradecyldimethyl(3-trimethoxysilylpropyl)ammonium chloride |
| | 4-(Trimethoxysilylethyl)benzyltrimethylammonium chloride |
| | S-(Trimethoxysilylpropyl)isothiouronium chloride |
| | N-Trimethoxysilylpropyl-N,N,N-trimethylammonium chloride |
| Antimicrobial quaternary ammonium | BTC-888 |
| | BTC-2125 |
| | BTC-818 |
| | BTC-1010 |
| | BTC-8358 |
| | BTC1210 |
| | ONYXIDE3300 |
| | FMB 65-28 |
| | Barquat 80-28 |
| | Barquat MB-80 |
| | Bardac MNB-65 |
| | Bardac 80 plus |
| | Bardac 2880/2080 |
| | FMB-1210-8 |
| | Bardac/uniquat 2280 |
| | Didecyl dimethyl ammonium citrate |
| | Didecyl dimethyl ammonium glycolate |
| | Didecyl dimethyl ammonium lactate |
| | Didecyl dimethyl ammonium propionate |
| | Didecyl dimethyl ammonium citrate |
| | Didecyl dimethyl ammonium glycolate |
| | Didecyl dimethyl ammonium lactate |
| | Didecyl dimethyl ammonium propionate |
| Auxiliary antimicrobial | Silver chloride |
| | Silver nanoparticle |
| | Silver iodide |
| | PHMB |
| | PHMB |
| | Chlorhexidine digluconate |
| | Chlorhexidine diacetate |
| | Phenol |
| | O-phenyl-phenol NaDCC |
| | Acetic acid |
| | Citric acid |
| | Glycolic acid |
| | Lactic acid |
| | Propionic acid |
| | Thymol |
| | Dodecyl Benzenesulfonic Acid |
| | Methylisothiazolinone |
| | Zinc pyrithione |

Table 2 sets forth performance-enhancing additives which may be utilized to provide the indicated benefits and functions noted in Table 2 when combined with antimicrobial formulation components described in Table 1.

TABLE 2

| Performance-Enhancing Additive | | | | | |
|---|---|---|---|---|---|
| Performance-Enhancing Additive | Durability | Efficacy | Aesthetics | Other Benefits | function |
| Amphokem | | | | ● | Amphoteric surfactant |
| N,N-Dimethyl-1-dodecylamine N-Oxide, 95% | | | ● | ● | Amphoteric surfactant |
| EDTA | ● | | | ● | Binding agent |
| halloysite nanotubes | ● | | | ● | Binding agent |
| Jaguar Optima | ● | | ● | | Binding agent |
| Joncryl 1532 | ● | | ● | | Binding agent |
| Joncryl HYB 6340 | ● | | ● | | Binding agent |
| Ludox AM, HAS, CL | ● | | | ● | Binding agent |
| Megatran | ● | | | | Binding agent |
| montmorillonite | ● | | | ● | Binding agent |
| PrimeraSil-1000 | | | ● | ● | Binding agent |
| Svntran 6301, 6302, 3106, 1940, 6145 | ● | | | | Binding agent |
| Poly vinyl alcohol | ● | ● | | ● | Binding agent |
| HALOX FLASH-X 150 | | | ● | ● | Corrosion inhibitor |
| Benzyl alcohol | | | | ● | Cosolvent |
| DOWANOL | | | ● | | Cosolvent |
| Ethanol | ● | ● | ● | ● | Cosolvent |
| Ethylene Glycol | | | ● | | Cosolvent |
| IPA | ● | ● | ● | ● | Cosolvent |
| n-Butanol | | | | ● | Cosolvent |
| Polyethylene glycol | | | | ● | Cosolvent |
| Polyethylene glycol 6k | | | ● | | Cosolvent |
| Polyethylenimine | | ● | | ● | Cosolvent |
| Polyglycol P 2000 | | | ● | | Cosolvent |
| propylene carbonate | | | | ● | Cosolvent |
| t-Butanol | | | | ● | Cosolvent |
| Diols and glycol derivatives | | | | ● | Cosolvent |
| Essential oil Orange | | | ● | ● | Fragrance |
| Essential oil Peppermint | | | ● | ● | Fragrance |
| Essential oil Tangerine | | | ● | ● | Fragrance |
| Essential oil Tea tree | | | ● | ● | Fragrance |
| Linalool | | | | ● | Fragrance |
| BIO-SOFT N25-7 | | ● | | ● | Nonionic surfactant |
| Butyl CELLOSOLVE | | | ● | | Nonionic surfactant |
| ECOSURF EH-9 | | | ● | | Nonionic surfactant |
| ECOSURF LFE-1410 | | ● | ● | ● | Nonionic surfactant |
| Ethoxylated castor oil | | | | ● | Nonionic surfactant |
| Glycerol monostearate | | ● | | ● | Nonionic surfactant |
| Lansurf AE320W | | | ● | | Nonionic surfactant |
| Surfynol61 | | ● | | ● | Nonionic surfactant |
| TERGITOL 15-S-40 | | ● | | ● | Nonionic surfactant |
| Tergitol NP-9 | | ● | | ● | Nonionic surfactant |
| Tergitol TMN-6 | | ● | | ● | Nonionic surfactant |
| Triton CG-110 | | ● | | ● | Nonionic surfactant |
| TRITON HW 1000 | | ● | ● | ● | Nonionic surfactant |
| TWEEN 20 | | ● | | ● | Nonionic surfactant |
| TWEEN 80 | | ● | | ● | Nonionic surfactant |
| Monoethanolamine | | ● | | | pH adjuster |
| DOWSIL 8526, 402LS, 210S, 56, 67 | | | ● | ● | Silicone modifier |
| SAG5693 | | | ● | ● | Silicone modifier |
| Silcolapse 621 | | | ● | ● | Silicone modifier |
| SilTech C-4660 | | | | ● | Silicone modifier |
| BYK-375, 377, 3455, 3720 | | | ● | | Surface modifier |
| Disperbyk 190 | | | ● | | Surface modifier |
| Dowsil 14 | | | ● | | Surface modifier |
| ACUSOL 445N | | | ● | ● | Thickening agent |
| ACUSOL PRO | | | ● | ● | Thickening agent |
| CELLOSIZE ™ Hydroxyethyl Cellulose | | | ● | ● | Thickening agent |

The feasibility of employing a dilutable product was contemplated. In this method, a highly concentrated (e.g. 60%) form of unhydrolyzed matrix components and active compounds were combined in an alcoholic solvent free of water or any moisture. After dilution in water and brief stirring, the solution was ready for use. It is also conceivable to produce a formulation devoid of antimicrobial ingredients (nil-active) as a vehicle for a two-step product design. A high concentration of the active component was diluted in the previously produced matrix solution prior to application.

General Method for Developing Formulations in the Examples

The required solvent was added to a 200 mL beaker equipped with a magnetic stir bar. At room temperature, additives and silanes from Table 1 and Table 2 were added sequentially to the solvent solution. The solution was agitated until homogeneity was achieved after each stage. Using the appropriate analytical technique, the concentration of the active ingredient(s) was/were verified for each formulation described in the examples shown in FIG. 1. Abrasion methods and efficacy tests were conducted on the example formulations disclosed in FIG. 1 according to protocols specified in FIG. 2.

Examples 1-3

In a series of studies, the antimicrobial activity of various silane quats, non-silane quats, and their mixes with concentrations ranging from 0.01 to 4.0 wt. % was evaluated as described in Examples 1, 2 and 3 in FIG. 1. Effectiveness tests were conducted with both solutions and dried residue. Based on the study results, it was determined that silane quats and non-silane quats are compatible.

Examples 4-6

In a study using both silane and non-silane quats, the effects of different potentiator/booster additions were evaluated (e.g. PVA, EDTA, PEG4000 and EcoSurf EH-9) with concentrations ranging from 0 to 8.0 wt. %. This screening included a variety of microbiological tests, including minimum inhibitory concentration (MIC), Kirby-Bauer Disc Diffusion Susceptibility Test, Quantitative Suspension Test for Evaluation of Bactericidal Activity of Chemical Disinfectants and Antiseptics (BS EN 1276), AOAC Germicidal Spray Products Test, Efficacy of Sanitizers Recommended for Inanimate, Hard, Nonporous Non Food Contact Surfaces via Spray Application (ASTM E1153) and Residual Self-Sanitizing Activity of Dried Chemical Residues on Hard, Non-Porous Surfaces (Protocol 01-1A). It has been shown that Examples 14-18 are capable of passing the aforementioned 01-1A protocol with at least a 3 log reduction.

Examples 7-13

The composition of the matrix was optimized by developing a formulation containing at least a cross-linker, hydrophilic-silane, hydrophobic silane, and their mixes as specified in the FIG. 1. Stability, wear resistance, and compatibility with standard cleaners/disinfectants were evaluated for the matrices.

Examples 14-18

Different combinations of a matrix, active(s), and additives were produced based on the findings of previous examples' optimizations. Active ingredient concentrations ranged from 0 to 8.0 wt. %, matrix component quantities ranged between 0.1 and 15 wt. %, and additive concentrations ranged from 0 to 8 wt. %. The stability of the improved formulations as an aqueous solution is at least one year. The time of application effectiveness against the investigated organisms is at least 5 log. After being applied to and curing on a surface, the inventive demonstrated the ability to withstand and survive numerous cycles of abrasion and inoculation (Protocol 01-1A) while keeping high aesthetic quality.

Results

The following summary findings are provided for the best-performing formulations described in the aforementioned examples. As a proof of concept, it was necessary to demonstrate that the matrix system can bind the active component to the surface and then release it upon interaction with microbes. To compare matrix-supported active components to unsupported actives, several rinses with water were chosen for the study approach. FIG. 3 demonstrates graphically that the unsupported actives were washed away, as evidenced by a considerable reduction in activity against representative Gram positive and Gram negative bacteria. A competitive durable antimicrobial product (CDAP) was employed as a control for this test under identical conditions. The substantial difference in a product's resistance to rinsing durability attests to the abilities of the current invention compared to earlier technologies.

Figure 4:
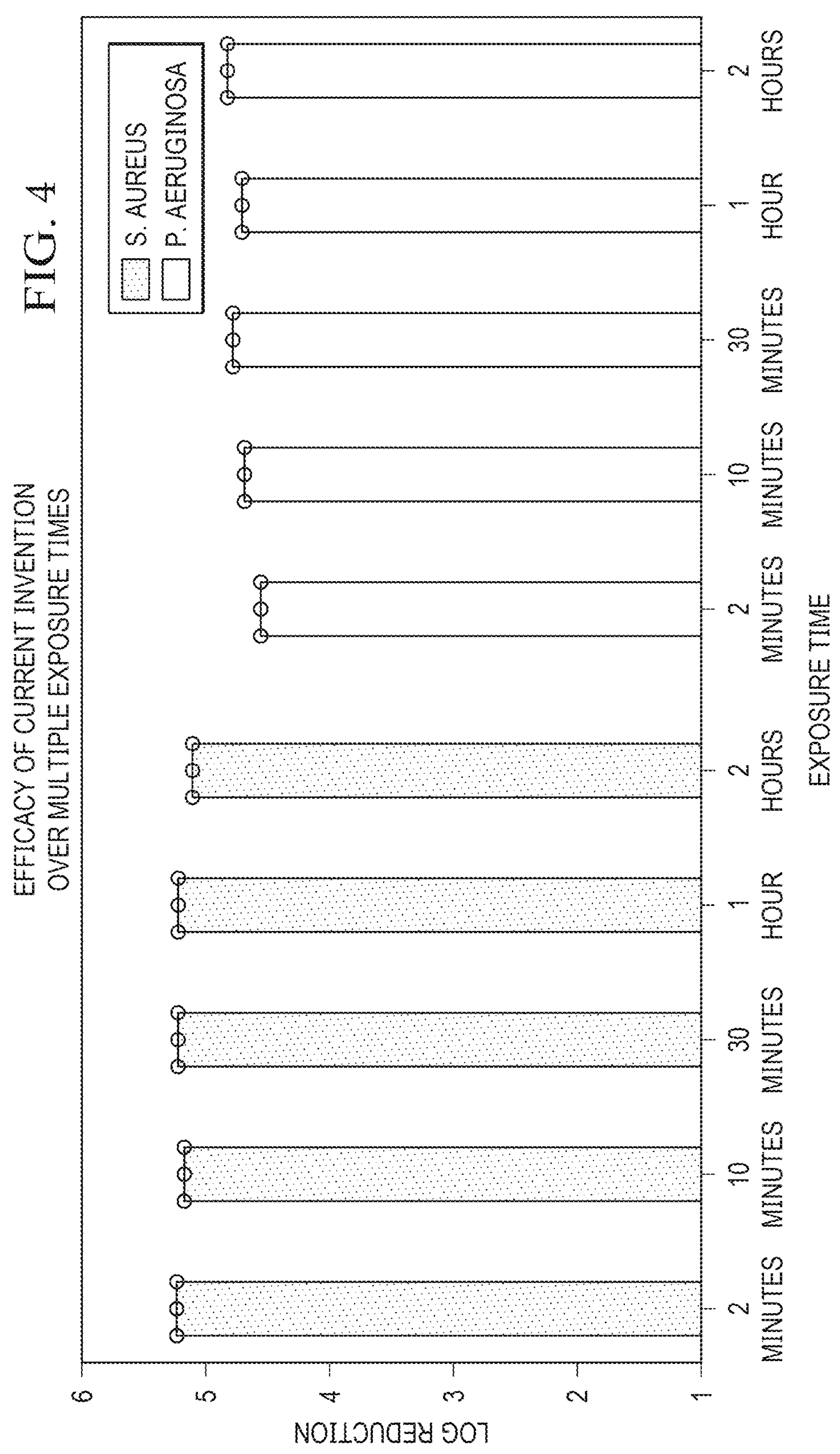
FIG. 4 illustrates residual antimicrobial efficacy for an experimental residual antimicrobial coating against Gram-positive and Gram-negative bacteria according to embodiments of the invention disclosed herein.
Figure 5:
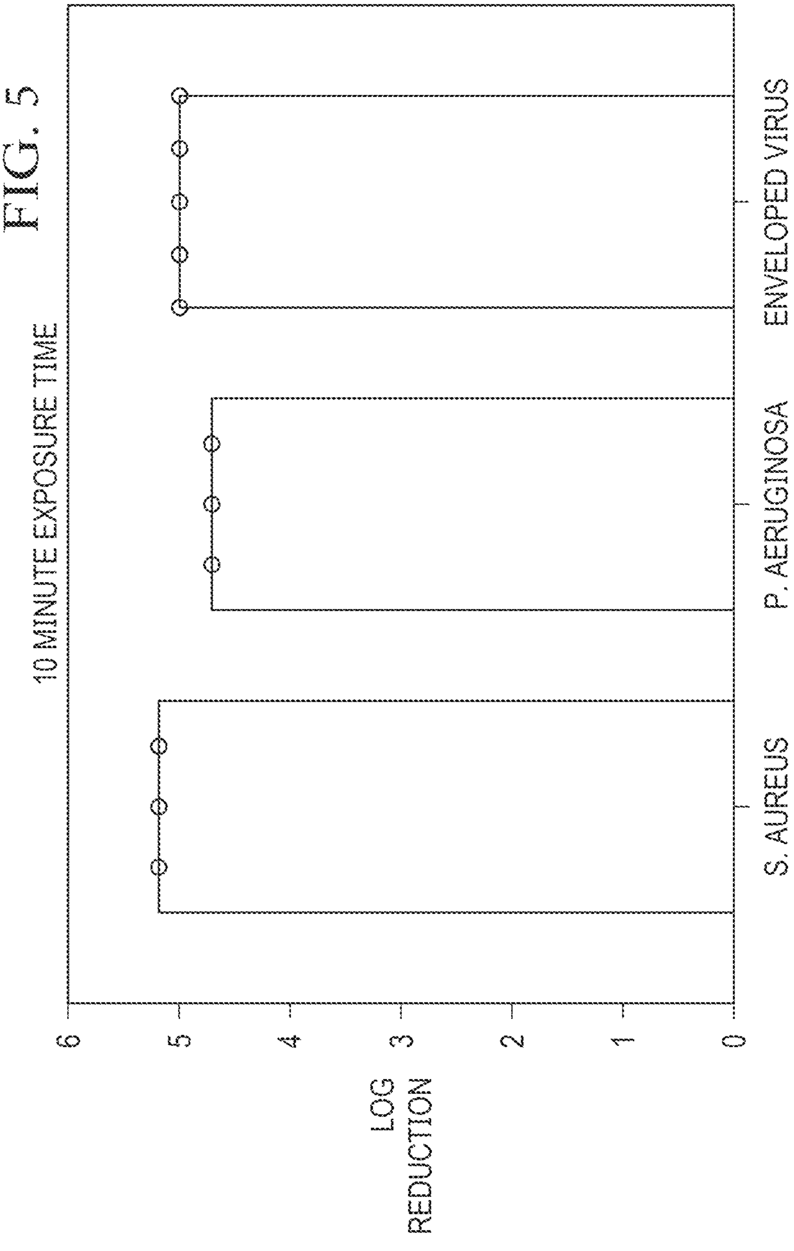
FIG. 5 illustrates results for the baseline efficacy of embodiments of the invention disclosed herein as a dried coating against representative Gram-positive and Gram-negative bacteria and an enveloped virus.

The inventive formulations were tested for disinfectant-level efficacy at the time of application (utilizing the AOAC GST test method) with contact times varying between 30 seconds to ten minutes. Furthermore, the fresh dried coating and abraded coating were exposed to a variety of microorganisms. The efficacy results of the dried coating are depicted in FIG. 4 and FIG. 5. In FIG. 4, the left set of bars graphically depict the efficacy of the inventive formulation against *S. aureus* at different contact times ranging from two minutes to two hours. The right set of bars graphically depict the efficacy of the inventive formulation against *P. aeruginosa* at different contact times ranging from two minutes to two hours. The contact times shown represent the time duration that the inoculum was allowed to remain on the surface of the inventive coating before recovery and measurement of the viable organisms remaining on the coating. As evidenced from the data in FIG. 4, the inventive coating achieves and maintains at least a 4-log reduction against representative Gram-positive and Gram-negative bacteria for up to a time period of two hours, a remarkable improvement in the art of antimicrobial coatings.

FIG. 5 depicts the baseline efficacy of an embodiment of the current invention as a dried coating against representative Gram-positive and a Gram-negative bacteria and an enveloped virus. Again, the inventive coating achieves disinfectant-level efficacy against viruses within a short exposure time, which is a major improvement for a dried antimicrobial coating.

Figure 6:
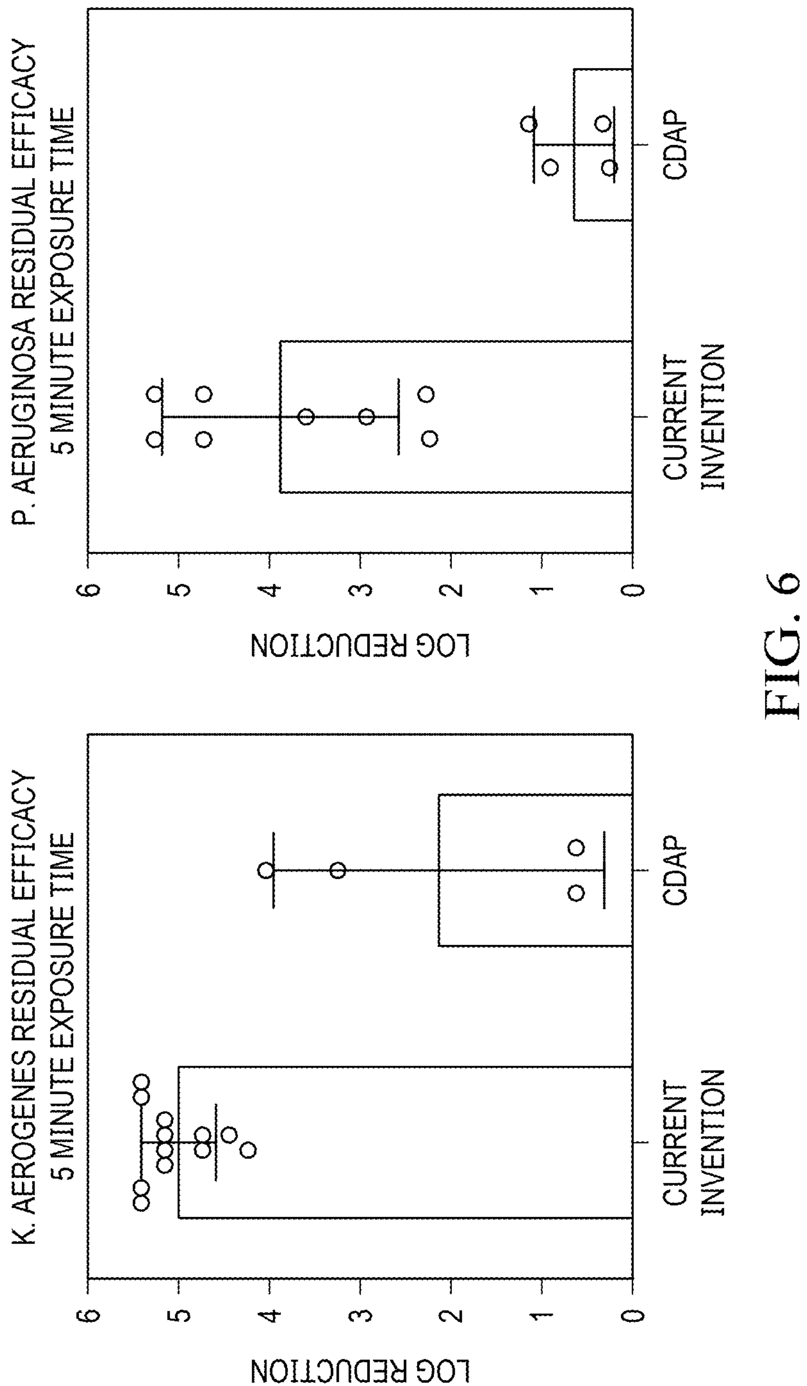
FIG. 6 illustrates results for a residual efficacy protocol according to embodiments of the invention disclosed herein.

FIG. 6 shows the results of a residual efficacy protocol, comparing an embodiment of the current invention disclosed herein with a coating obtained from a competitive durable antimicrobial product, delineated as "CDAP" in the graphical depictions. As shown, the current invention demonstrates residual efficacy and outperforms CDAP under identical test conditions. For this test, glass carriers are exposed to a low level of contamination, the 'initial inoculation', which is dried onto the glass surface to represent any contamination present on a surface prior to the use of an antimicrobial product. The test product was applied to the 'contaminated' glass carriers and allowed to dry. A standardized instrument, the Gardco Washability and Wear Tester, is used to simulate the physical wear and tear on a surface that has been coated with an antimicrobial formulation. Treated carriers are abraded with a dry cotton cloth or a cotton cloth that has been moistened with water. The dry and wet abrasions alternate until the desired level of wear and tear has been achieved; these are defined as "abrasion cycles". Between abrasion cycles, carriers are subjected to low level contamination events, 'reinoculations'. These events represent the potential for a surface to experience multiple contamination episodes over a 24-hour period. To assess the residual efficacy of the antimicrobial formulation after completion of the abrasion and reinoculation regime, the carriers are challenged with a high-level contamination event, the 'final inoculation'. At least 99.9% of bacteria from the final inoculation must be eliminated within 5 minutes to satisfy the regulatory requirements of a residual sanitizer. In addition, the residual efficacy procedure described above was repeated up to five times, (equivalent to 5 days durability), to test the coating's durability and antibacterial capabilities for prolonged usage durations that exceed 24 hours.

Figure 7:
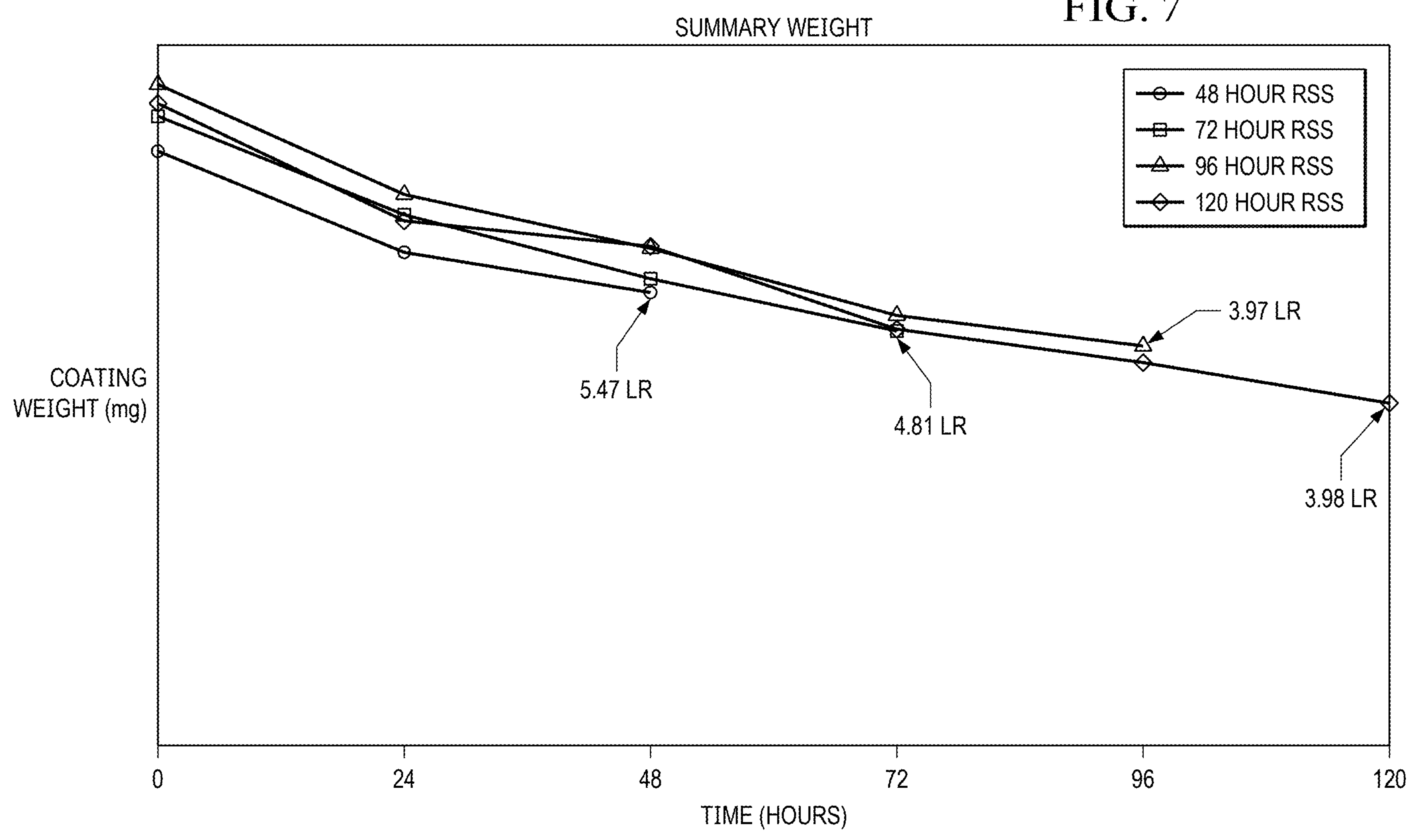
FIG. 7 illustrates the coating weight differential in repeated residual efficacy protocols up to 120 hours, according to embodiments of the invention disclosed herein.

FIG. 7 demonstrates that one or more embodiments of the invention satisfy the criteria of a residual sanitizer for up to five days by maintaining a 3.0 log-reduction (LR). FIG. 7 also shows that as the number of abrasions and recontamination events increases, the weight of the improved antimicrobial coating disclosed herein decreases without significantly compromising efficacy. An unforeseen advantage of these inventive formulations was the absence of sticky, waxy, or greasy residues on treated surfaces and the absence of visible coating residues.

Figure 8:
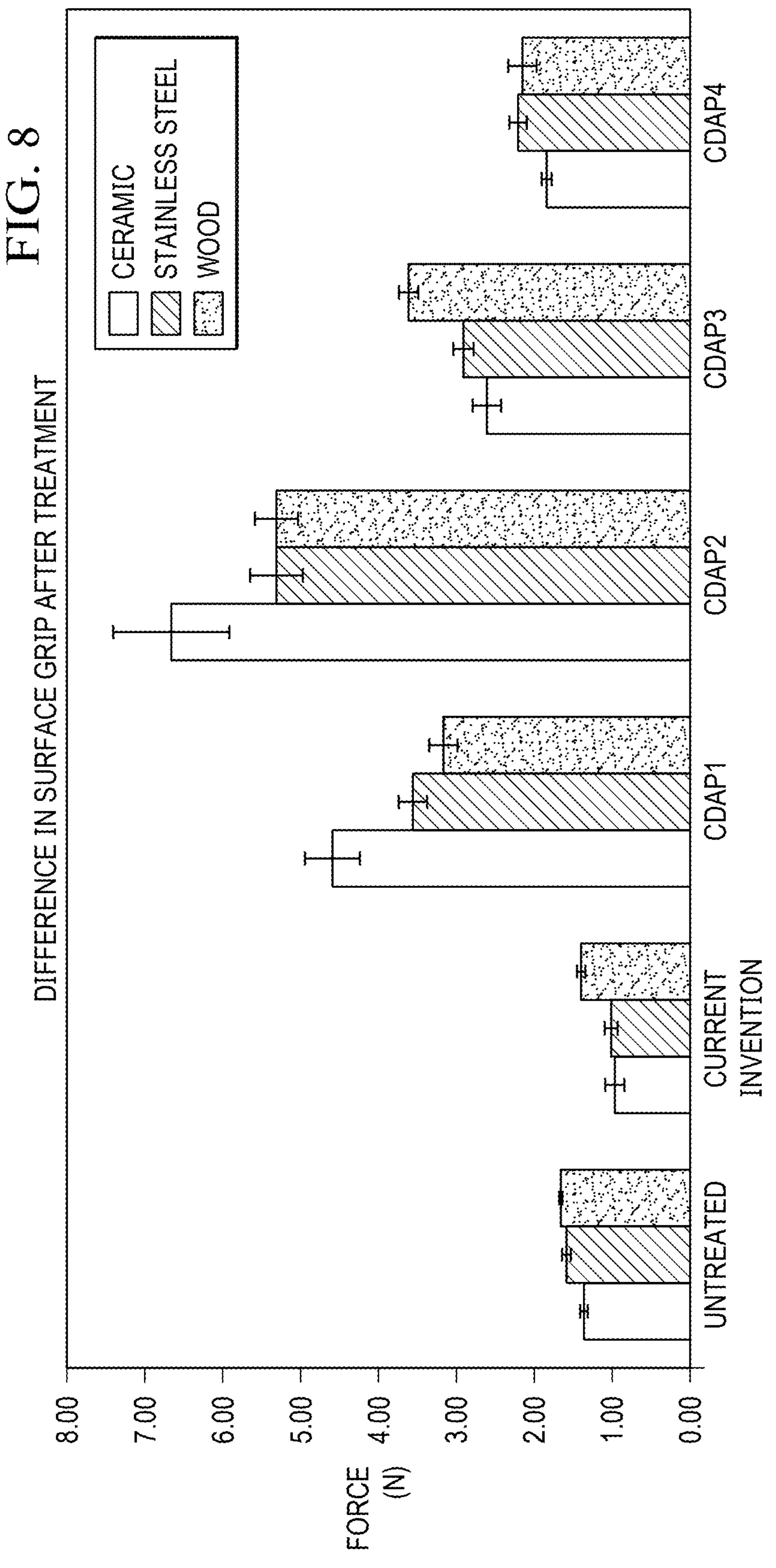
FIG. 8 illustrates the surface grip differential of various surface types treated with embodiments of the invention disclosed herein; and, FIG. 9 illustrates the percentage change in the antimicrobial coating's resistance to various cleaning/disinfectant products according to embodiments of the invention disclosed herein.

FIG. 8 graphically depicts the resulting differences observed in surface grip after treatment of ceramic, stainless steel, and wood surfaces with various embodiments of the inventive coating formulations disclosed herein. The surface grip of the inventive formulations was compared to that of a number of competing durable antibacterial products (CDAP). The friction, adhesion, and slickness of treated surfaces were evaluated for any changes in those properties. A push-pull force gauge was used to measure friction forces. The change in pull force would serve to indicate that the surface is getting stickier or more slippery. As noted in FIG. 8, the observed change in surface grip was minimal when compared to other CDAP coatings that were tested.

Figure 9:
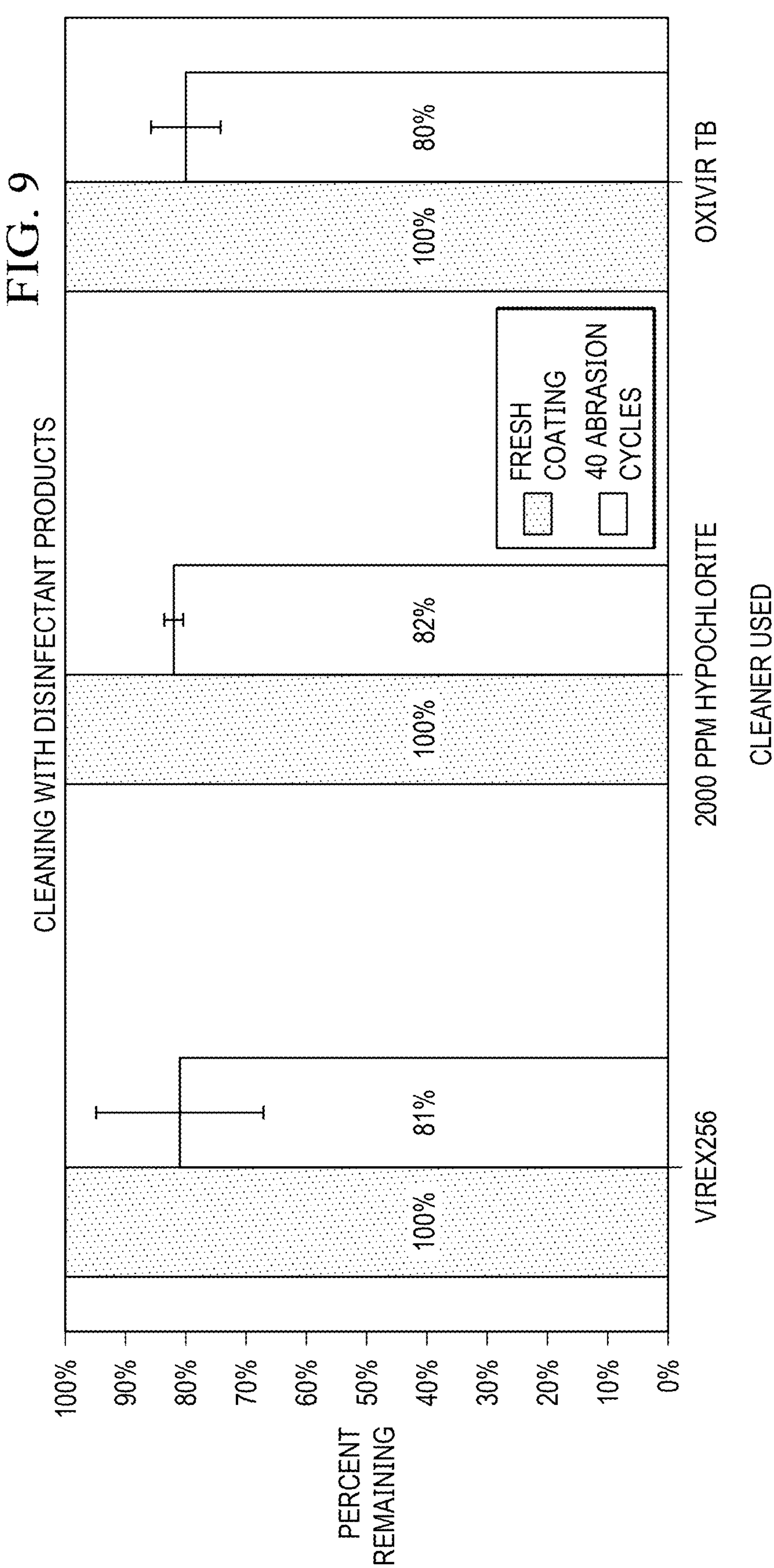

FIG. 9 depicts the percentage change in the improved antimicrobial coatings compatibility and resistance to common cleaners/disinfectants, such as Oxivir TB (0.5% hydrogen peroxide), Virex256 (0.8% quaternary ammonium), bleach (Sodium hypochlorite 2000 ppm), and Virex256 were evaluated as described in examples 14-18 described herein. Utilizing a Gardco Washability and Wear Tester to simulate repeated cleaning cycles. After 40 cycles of abrasion, the remaining coating percentage was determined by weight.

In the detailed description, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, coupled or the like may include permanent (e.g., integral), removable, temporary, partial, full, and/or any other possible attachment option. Any of the components may be coupled to each other via friction, snap, sleeves, brackets, clips or other means now known in the art or hereinafter developed. Additionally, any reference to without contact (or similar phrases) may also include reduced contact or minimal contact.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

All structural, chemical, and functional equivalents to the elements of the above-described various embodiments that are known to those of ordinary skill in the art are expressly incorporated herein by reference and are intended to be encompassed by the present claims. Moreover, it is not necessary for an apparatus or component of an apparatus, or method in using an apparatus to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a chemical, chemical composition, process, method, article, or apparatus that comprises a list of elements does not include only those elements but may include other elements not expressly listed or inherent to such chemical, chemical composition, process, method, article, or apparatus.

The invention claimed is:

1. An antimicrobial coating composition comprising:

at least one antimicrobial compound;

at least one durable matrix forming compound selected from at least one organosilane;

optionally, at least one performance-enhancing additive which is a cross-linker; and, water.

2. The antimicrobial coating composition of claim 1, wherein the at least one antimicrobial compound is selected from the group consisting of non-silane cationic quaternary compounds, Chlorhexidine digluconate, Chlorhexidine diacetate, cationic peptidopolysaccharides, ionenes, polyhexamethylene biguanide (PHMB) polyethylenimines (PEIs), ionic poly [2-(tert-butylaminoethyl) methacrylate] (PTBAM), and mixtures thereof.

3. The antimicrobial coating composition of claim 1, wherein the at least one durable matrix forming compound comprises a mixture of hydrophobic and hydrophilic organosilanes.

4. The antimicrobial coating composition of claim 1, wherein the water is replaced with at from about 0.0 wt. % to about 60 wt. % of a water-miscible solvent based on the total weight of the antimicrobial coating composition.

5. The antimicrobial coating composition of claim 1, wherein the antimicrobial compound is present at from about 0.01 wt. % to about 4 wt. %, based on the total weight of the antimicrobial coating composition.

6. The antimicrobial coating composition of claim 1, wherein the durable matrix forming compound is present at from about 0.01 wt. % to about 15 wt. %, based on the total weight of the antimicrobial coating composition.

7. The antimicrobial coating composition of claim 1, wherein the performance-enhancing additive is present at from about 0.0 wt. % to about 8 wt. %, based on the total weight of the antimicrobial coating composition.

8. The antimicrobial coating composition of claim 1, wherein the antimicrobial coating is substantially haze-free.

9. The antimicrobial coating composition of claim 1, wherein the antimicrobial coating exhibits substantially no oil residue.

10. The antimicrobial coating composition of claim 1, wherein the antimicrobial coating is substantially tack-free.

11. The antimicrobial coating composition of claim 3, wherein the hydrophilic silane is selected from aminopropyltriethoxysilane, 3-aminopropyl(diethoxy)methylsilane, trimethoxy[3-(methylamino)propyl]silane, N-[3-(trimethoxysilyl)propyl]ethylenediamine, 3-(2-aminoethylamino)propyldimethoxymethylsilane, N1-(3-trimethoxysilylpropyl)diethylenetriamine and N-[3-(trimethoxysilyl)propyl]butan-1-amine;

the hydrophobic silane is selected from methyltriethoxysilane, ethyltriethoxysilane, propyltriethoxysilane, dimethyldimethoxysilane, bis(triethoxysilyl) methane and bis(triethoxysilyl) ethane; and the cross-linker is selected from $AlCl_3$, $B(OH)_3$, $TiCl_4$, $Ti(OiPr)_4$, $SiCl_4$, $Si(OMe)_4$, $Si(OEt)_4$, pentaerythritol and neopentylglycol.

* * * * *